United States Patent
Zhang et al.

(10) Patent No.: US 12,522,874 B2
(45) Date of Patent: Jan. 13, 2026

(54) BROAD-SPECTRUM NANOPARTICLE ENABLED GENOMIC DETECTION

(71) Applicant: The Regents of the University of California, Oakland, CA (US)

(72) Inventors: Liangfang Zhang, San Diego, CA (US); Wei Wang, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 1044 days.

(21) Appl. No.: 17/607,200

(22) PCT Filed: Apr. 30, 2020

(86) PCT No.: PCT/US2020/030658
§ 371 (c)(1),
(2) Date: Oct. 28, 2021

(87) PCT Pub. No.: WO2020/223454
PCT Pub. Date: Nov. 5, 2020

(65) Prior Publication Data
US 2022/0221464 A1    Jul. 14, 2022

Related U.S. Application Data

(60) Provisional application No. 62/841,009, filed on Apr. 30, 2019.

(51) Int. Cl.
*C12Q 1/6886* (2018.01)
*C12Q 1/6874* (2018.01)
*C12Q 1/6883* (2018.01)
*G01N 33/543* (2006.01)
*G01N 33/554* (2006.01)

(52) U.S. Cl.
CPC ......... *C12Q 1/6886* (2013.01); *C12Q 1/6874* (2013.01); *C12Q 1/6883* (2013.01); *G01N 33/54346* (2013.01); *G01N 33/554* (2013.01); *C12Q 2600/112* (2013.01); *C12Q 2600/154* (2013.01); *C12Q 2600/156* (2013.01)

(58) Field of Classification Search
None
See application file for complete search history.

(56) References Cited

U.S. PATENT DOCUMENTS

| | | |
|---|---|---|
| 12,097,290 B2 | 9/2024 | Zhang |
| 2003/0203507 A1 | 10/2003 | Liberti |
| 2016/0136106 A1 | 5/2016 | Zhang et al. |
| 2016/0312298 A1 * | 10/2016 | Ting ................ G01N 33/57484 |
| 2023/0051094 A1 | 2/2023 | Gao |

FOREIGN PATENT DOCUMENTS

| | | | |
|---|---|---|---|
| CN | 109507418 A | 3/2019 | |
| CN | 109507418 B * | 1/2020 | ....... G01N 33/54326 |
| WO | 2012103025 A2 | 8/2012 | |
| WO | WO2015021390 * | 2/2015 | |
| WO | WO-2015021390 A2 * | 2/2015 | ............... A61K 9/51 |
| WO | 2015095527 A1 | 6/2015 | |
| WO | 2017027760 A1 | 2/2017 | |

OTHER PUBLICATIONS

Rao et al (Adv Funct Mater. Jul. 2018. 28: 1803531, p. 1-9 and Supporting Information, 28 pages (Year: 2018).*
Fan et al Genomic Medicine. Feb. 1, 2019. 4:2, p. 1-11 (Year: 2019).*
Ramskold et al Nature Biotechnology. Aug. 2012. 30(8): 777-782 and Online Methods, 2 pages (Year: 2012).*
Rao et al Advanced Functional Materials. Jul. 13, 2018. 28, 180531, p. 1-9 and Supporting Information, 37 pages total (Year: 2018).*
International Search Report and Written Opinion for International Application No. PCT/US2020/030658, dated Sep. 14, 2020 (8 pages).

* cited by examiner

*Primary Examiner* — Carla J Myers
(74) *Attorney, Agent, or Firm* — Eversheds-Sutherland (US) LLP

(57) ABSTRACT

Described are methods, compositions, and devices for early detection and prevention of diseases, including cancer, infectious diseases, and autoimmune diseases, using broad-spectrum enrichment technology and single cell sequencing technology. An example method for detecting circulating tumor cells (CTCs) using platelet membrane-coated nanoparticles (PNPs) and single cell RNA sequencing (scRNA-seq) technology is also provided.

14 Claims, 6 Drawing Sheets

BROAD-SPECTRUM NANOPARTICLE ENABLED GENOMIC DETECTION

CROSS REFERENCE TO RELATED APPLICATIONS

This application claims the priority benefit of PCT/US2020/030658 filed on Apr. 30, 2020, which claims the priority benefit of U.S. Provisional Application No. 62/841,009, filed Apr. 30, 2019, which applications are incorporated herein by reference.

TECHNICAL FIELD

This patent document relates to the use of broad-spectrum enrichment technology and single cell sequencing technology for effective and accurate detection of diseases, including cancer, infectious diseases, and autoimmune diseases. In particular, the presently disclosed technology can be used for the detection and characterization of circulating tumor cells (CTCs).

BACKGROUND

A major hurdle of utilizing the clinical potential of CTCs is that they are very rare (as low as 1 to 10 cells in 1 million blood cells), which makes them extremely difficult to capture. Many methods have been developed to enrich CTCs, and they largely fall into two categories. The first category utilizes the biophysical properties of CTCs, such as deformability, density, cell surface charge, and size, But given the variability of the diverse cells in the blood, these methods often stiffer from low specificity. The second category relies on positive or negative immunoaffinity selection based on the surface markers of CTCs. The positive selection strategy relies on the specific surface proteins such as EpCAM used in CellSearch, an FDA approved technology for CTC enrichment that requires prior knowledge about the cancer type. The positive selection approach also suffers from the heterogeneity of cancer cells, such as when CTCs undergo the epithelial-mesenchymal transition (EMT) process and lose the epithelial markers, which leads to false negatives. The negative selection strategy aims to remove the large number of red blood cells, white blood cells, and platelets. The negative selection approach is unbiased but likely retains non-CTC circulating cells such as epithelial cells in the bloodstream, which leads to false positives.

SUMMARY

This patent document provides a novel approach for effective and sensitive detection of CTCs and other biological subjects based on a nanoparticle-based enrichment technology that overcomes limitations of the existing enrichment methods.

In one aspect, the present patent document provides methods for broad or unbiased enrichment of a target subject in a biological sample by contacting, the biological sample with nanoparticles coated with a cell membrane that has a binding affinity with the target subject. In some embodiments, the target subject is CTCs and the nail particles are platelet membrane-coated nanoparticles (PNPs).

In another aspect, the present patent document provides methods for broadly enriching and genetically identifying target cells in a biological sample by enriching the target cells using cell membrane-coated nanoparticles and performing single cell sequencing on the enriched target cells. In some embodiments, the target subject is PNP-enriched CTCs. In other embodiments, the single cell sequencing is single cell RNA sequencing (scRNA-seq).

In another aspect, the present patent document provides methods for identifying the cancer type or subtype of CTCs in a biological sample by performing scRNA-seq on PNP-enriched CTCs and comparing the scRNA-seq results to a plurality of genes whose expression profiles are associated with different types or subtypes of cancer.

BRIEF DESCRIPTION OF THE DRAWINGS

FIGS. 6A-6H show the Heracles framework.

DETAILED DESCRIPTION

Figures 1A, 1B, 1C, 1D, 1E, 1F:
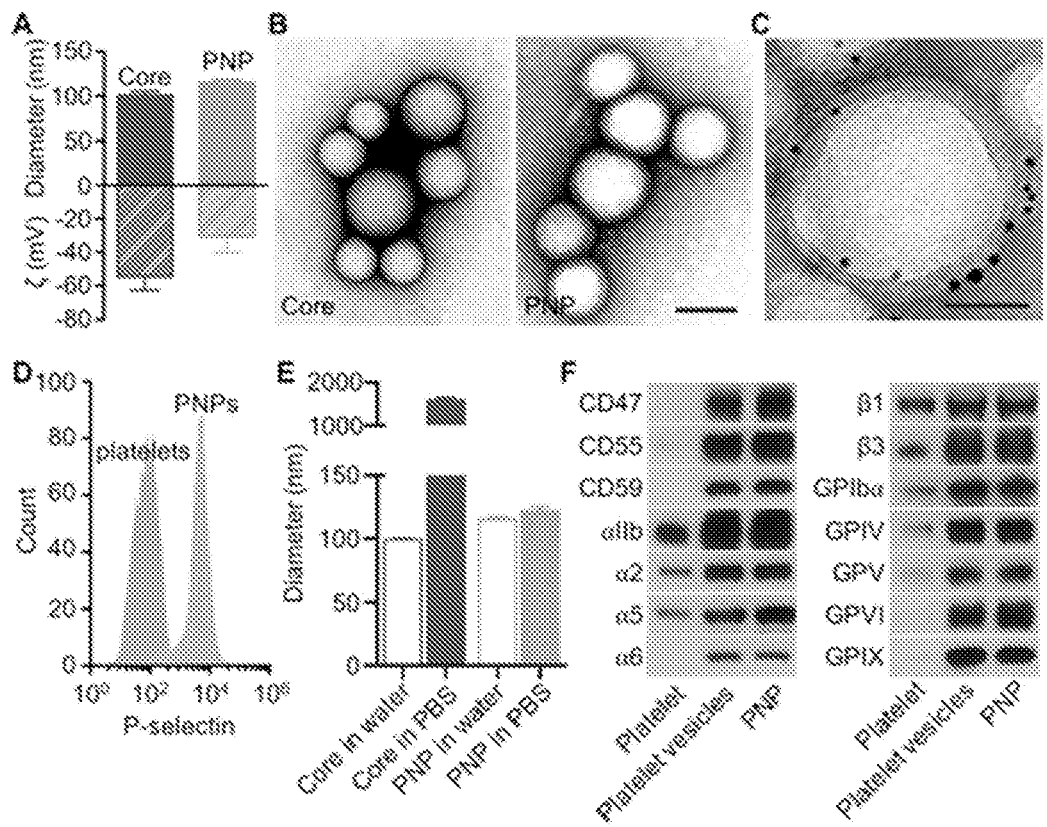
FIGS. 1A-1F show PNP preparation and characterization.

Biologically, CTCs attract platelets on their surface in order to escape the attack of the immune cells and to reduce apoptosis of the tumor cells and the shear stress experienced in circulation. The interaction with platelets is crucial for CTCs' survival in the bloodstream. Thus, the platelet membrane is embedded with receptors recognizing CTCs not specific to any cancer type, which makes the platelet membrane a natural and general capturing probe for CTCs of all cancer types.

PNPs are nanoparticles coated with the natural cellular membrane of platelets. These biomimetic nanoparticles can effectively enrich CTCs in blood samples due to the natural interaction between CTCs and platelets. PNPs can capture viable CTCs without prior information of cancer type and thus has the unique advantage of detecting cancer at early stages when no clinical diagnosis is done. Importantly, PNP-enabled capture of CTCs does not rely on antibodies that recognize specific antigens on. CTCs, such as epithelial markers, because platelets interact with CTCs of all cancer types. The power of this technology has been demonstrated by the successful capture of a small number of cancer cells mixed with a large number of leucocytes or spiked in human blood. The presently disclosed technology is broad-spectrum and allows enrichment of live cancer coils for genomic characterization.

PNPs are able to enrich CTCs for any type of cancer, which provides a general probe to detect CTCs. This feature is particularly useful for early detection, and treatment, of cancer without requiring prior information of cancer type or subtype. Meanwhile, it also poses a challenge to determine the cancer type or subtype based on the enriched CTCs. To fully realize the PNP capture advantage, an accurate and robust identification of the captured CTCs is required. Given the small number of CTCs present in the circulation, scRNA-seq analysis provides a good option to profile gene expression of PNP-enriched CTCs and characterize their cancer type or subtype based on the gene expression profile.

However, determining cancer type or subtype based on scRNA-seq remains a challenge because cancer cells are heterogeneous and single cell measurement is noisy. Practically, single cell data on tumor samples that can be used as benchmarks for annotating the captured CTCs may be limited. The invention further provides novel bioinformatics strategies, a benchmark data set for each cancer type or subtype and a robust algorithm to accurately classify a single CTC, to overcome these challenges. The invention provides genes that can distinguish cancer samples from normal samples, as well as different cancer types studied by TCGA. These so-called "triple-evidenced genes" are characterized by differential gene expression and DNA methylation and are associated with somatic mutations, Leveraging on this finding, the invention provides a new bioinformatics framework and computational strategy to identify a subset of these genes that can be robustly detected by scRNA-seq, and can thus be used to determine the cancer origin of the captured CTCs.

The presently disclosed technology provides at least the following innovative aspects. First, this novel, broad-spectrum method is able to capture CTCs from any cancer type without prior information. In embodiments, PNPs are generated by coating, nanoparticles with platelet membranes that provide an array of surface proteins. Although it is unclear which receptors are important for CTC-platelet interaction, inclusion of the entire membrane avoids any bias in selecting particular surface markers. Importantly, because the interaction between CTCs and platelets is critical for the survival of CTCs of any cancer type, the presently disclosed invention is generally applicable and does not require prior information of the cancer type. Moreover, because CTCs are released during early tumor development, capturing CTCs using PNPs without prior information is particularly useful for early detection of cancer and metastasis.

Second, the presently disclosed invention takes advantage of a novel computational framework that can accurately identify the cancer type or subtype based on scRNA-seq data. This innovative approach overcomes two main roadblocks for identifying CTCs based on scRNA-scq data: (i) robust bioinformatics methods that can accurately predict the cancer type based on scRNA-seq data are still lacking because of the noisy nature of scRNA-seq data; and (ii) to reduce the impact of tumor heterogeneity, scRNA-seq on cancer cells obtained from tumor samples is the best way to uncover the cancer transcriptomic signature, but is not currently available for every major cancer. In the studies described herein, the cancer transcriptomic signature is derived using the bulk RNA sect data generated on many cancers and on hundreds or thousands of patients. Using this signature, a new computational strategy has been developed to determine the origin of each CTC based on its scRNA-seq data, which is the first of its kind.

Third, the combination of technologies of nanoengineering and genomics provides a conceptually novel and practically feasible approach. Broad-spectrum capture CTCs does not distinguish the cancer type or subtype from which the CTCs are originated. This limitation is overcome by transcriptomic profiling of the captured CTCs. The efficient CTC-enrichment using PNPs aids the single cell analysis as it retrieves more CTCs to increase the detection power. Such a synergy makes this approach. a powerful tool for liquid biopsy. Furthermore, the captured viable CTCs also allow additional single cell analysis such as DNA sequencing, ATAC-seq, and splicing analysis to better understand cancer biology and characterize tumor progress.

The present invention provides methods for enrichment of a target subject in a biological sample. In embodiments, the invention provides methods comprising contacting the biological sample with one or more nanoparticles coated with a cell membrane that has a binding affinity with the target subject. In embodiments, the invention provides methods comprising coating one or more nanoparticles with a cell membrane that has a binding affinity with the target subject, and contacting the nanoparticles with the biological sample. In embodiments, the invention provides that the cell membrane is platelet membrane.

In embodiments, the invention provides that the target subject is circulating tumor cells (CTCs). In embodiments, the invention provides that the CTC is breast cancer, lung cancer, ovarian cancer, or stomach cancer. In embodiments, the invention provides that the biological sample is from a mammal, including a human patient. In embodiments, the invention provides that the nanoparticles have poly(lactic-co-glycolic acid) (PLGA) cores. In embodiments, the invention provides that the method further comprises at least partially isolating the nanoparticles bound to the target subject from the biological sample.

The present invention provides methods for enriching and genetically identifying target cells in a biological sample. In embodiments the method comprises enriching the target cells by contacting the biological sample with nanoparticles coated with a cell membrane that has a binding affinity with the target cells; and performing single cell nucleic acid sequencing, on the enriched target cells. In embodiments, the cancer samples are distinguished front non-cancer cells using tripled-evidenced genes. In embodiments, the single cell nucleic acid sequencing is single cell RNA sequencing. (scRNA-seq). In embodiments, the method further comprises before performing the single cell nucleic acid sequencing, at least partially isolating the nanoparticles bound to the target subject from the biological sample.

In embodiments, the invention provides that the cell membrane is platelet membrane, In embodiments, the invention provides that the target subject is circulating tumor cells (CTCs). In embodiments, the invention provides that the CTC is breast cancer, lung cancer, ovarian cancer, or stomach cancer, in embodiments, the invention provides that the biological sample is from a mammal, including a human patient. In embodiments, the invention provides that the nanoparticles have poly(lactic-co-glycolic acid) (PLGA) cores. In embodiments, the invention provides that the method further comprises at least partially isolating the nanoparticles bound to the target subject from the biological sample.

The present invention provides methods for identifying a cancer type or subtype of CTCs in a biological sample, comprising: enriching the CTCs by contacting the biological sample with PNPs, performing scRNA-seq on the enriched CTCs; and determining the cancer type or subtype of the CTCs based on a comparison of the scRNA-seq and a plurality of genes whose expression profiles are associated with different types or subtypes of cancer. In embodiments, the invention provides that the cancer type is breast cancer, lung cancer, ovarian cancer, or stomach cancer. In embodiments, the invention provides that the biological sample is from a mammal, including a human patient. The present invention further provides methods of treatment of a patient comprising administering to a patient in need an effective amount of a treatment (pharmaceutical, surgical or radiological) to inhibit the cancer identified in a biological sample of the patient.

The present invention provides enriched CTC compositions comprising CTCs at least partially isolated from a biological sample of a patient, wherein the CTCs are bound to platelet membrane-coated nanoparticles. In embodiments, the CTC is breast cancer, lung cancer, ovarian cancer, or stomach cancer. In embodiments, the invention provides that the biological sample is from a mammal, including a human patient.

The practice of the present invention will employ, unless otherwise indicated, conventional techniques of nanotechnology, nano-engineering, molecular biology (including recombinant techniques), microbiology, cell biology, biochemistry, immunology, and pharmacology, which are within the skill of the art. Such techniques are explained fully in the literature, such as, *Molecular Cloning: A Laboratory Manual*, $2^{nd}$ ed. (Sambrook et al., 1989); *Oligonucleotide Synthesis* (M. J. Gait, ed., 1984); *Animal Cell Culture* (R. I. Freshney, ed., 1987); *Methods in Enzymology* (Academic. Press, Inc.); *Current Protocols in Molecular Biology* (F. M, Ausubel et at, eds., 1987, and periodic updates); *PCR: The Polymerase Chain Reaction* (Mullis et al. eds., 1994); and Remington, *The Science and Practice of Pharmacy*, $20^{th}$ ed., (Lippincott, Williams & Wilkins 2003).

To facilitate understanding of the invention, a number of terms and abbreviations as used herein are defined below as follows:

When introducing elements of the present invention or the preferred embodiment(s) thereof the articles "a", "an", "the" and "said" are intended to mean that there are one or more of the elements. The terms "comprising", "including" and "having" are intended to be inclusive and mean that there may be additional elements other than the listed elements.

The term "and/or" when used in a list of two or more items, means that any one of the listed items can be employed by itself or in combination with any one or more of the listed items. For example, the expression "A and/or B" is intended to mean either or both of A and B, i.e., A alone, B alone or A and B in combination. The expression "A, B and/or C" is intended to mean A alone, B alone, C alone, A and B in combination A and C in combination. B and C in combination or A, B, and C in combination.

The term "cellular membrane" as used herein refers to a biological membrane enclosing or separating structure acting as a selective barrier, within or around a cell or an emergent viral particle. In embodiments, the cellular membrane is a platelet membrane. The cellular membrane is selectively permeable to ions and organic molecules and controls the movement of substances in and out of cells. The cellular membrane comprises a phospholipid uni- or bilayer, and optionally associated proteins and carbohydrates, As used herein, the cellular membrane refers to a membrane obtained from a naturally occurring biological membrane of a cell or cellular organelles, or one derived therefrom. As used herein, the term "naturally occurring" refers to one existing in nature. As used herein, the term "derived therefrom" refers to any subsequent modification of the natural membrane, such as isolating the cellular membrane, creating portions or fragments of the membrane, removing and/or adding certain components, such as lipid, protein or carbohydrates, from or into the membrane taken from a cell or a cellular organelle. A membrane can be derived from a naturally occurring membrane by any suitable method. For example, a membrane can be prepared or isolated from a cell or a virus and the prepared or isolated membrane can be combined with other substances or materials to form a derived membrane. In another example, a cell or virus can be recombinantly engineered to produce "non-natural" substances that are incorporated into its membrane in vivo, and the cellular or viral membrane can be prepared or isolated from the cell or the virus to form a derived membrane.

In various embodiments, the cellular membrane covering either of the unilamellar or multilamellar nanoparticles can be further modified to be saturated or unsaturated with other lipid components, such as cholesterol, free fatty acids, and phospholipids, and also can include endogenous or added proteins and carbohydrates, such as cellular surface antigen. in such cases, an excess amount of the other lipid components can be added to the membrane wall which will shed until the concentration in the membrane wall reaches equilibrium, which can be dependent upon the nanoparticle environment. Membranes may also comprise other agents that may or may not: increase an activity of the nanoparticle. In other examples, functional groups such as antibodies and aptamers can be added to the outer surface of the membrane to enhance site targeting, such as to cell surface epitopes found in cancer cells. The membrane of the nanoparticles can also comprise particles that can be biodegradable, cationic nanoparticles including, but not limited to, gold, silver, and synthetic nanoparticles.

The term "synthetic membrane" or "artificial membrane" refers to a man-made membrane that is produced from organic material, such as polymers and liquids, as well as inorganic materials. A wide variety of synthetic membranes are well known in the art.

The term "nanoparticle" as used herein refers to nanostructure, particles, vesicles, or fragments thereof having at least one dimension (e.g., height, length, width, or diameter) of between about 1 nm and about 10 μm. For systemic use, an average diameter of about 50 nm to about 500 nm, or 100 nm to 250 nm may be preferred. The term "nanostructure" includes, but is not necessarily limited to, particles and engineered features. The particles and engineered features can have, for example, a regular or irregular shape. Such particles are also referred to as nanoparticles. The nanoparticles can be composed of organic materials or other materials, and can alternatively be implemented with porous particles. The layer of nanoparticles can be implemented with nanoparticles in a monolayer or with a layer having agglomerations of nanoparticles. In some embodiments, the nanoparticle comprises or consists of an inner core covered by an outer surface comprising the membrane as discussed herein. The invention contemplates any nanoparticles now known and later developed that can be coated with the membrane described herein.

The term "phospholipid", as used herein, refers to any of numerous lipids containing a diglyceride, a phosphate group, and a simple organic molecule such as choline. Examples of phospholipids include, but are not limited to, Phosphatide acid (phosphatidate) (PA), Phosphatidylethanolamine (cephalin) (PE), Phosphatidylcholine (lecithin) (PC), Phosphatidylserine (PS), and Phosphoinositides which include, but are not limited to, Phosphatidyliriositol (PI), Phosphatidylinositol phosphate (PIP), Phosphatidylinositol bisphosphate (PIP2) and Phosphatidylinositol triphosphate (PIP3). Additional examples of PC include DDPC, DLPC, DMPC, DPPC, DSPC, DOPC, POPC, DRPC, and DSPC as defined in the art.

It is understood that aspects and embodiments of the invention described herein include "consisting" and/or "consisting essentially of" aspects and embodiments.

Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The present methods can be used to detect CTCs or other target subjects by a membrane coated nanoparticle in any suitable biological sample from a patient. In some embodiments, the biological sample is obtained from a mammal. In some embodiments, the mammal is a human. In other embodiments, the mammal is a non-human mammal., including a pet, a farm animal, an economic animal, a sport animal and an experimental animal, such as a cat, a dog, a horse, a cow, an ox, a pig, a donkey, a sheep, a lamb, a goat, a mouse, a rabbit, a primate, including a monkey and a chimpanzee.

The nanoparticle used in the present methods can comprise any suitable inner core. For example, the inner core of the nanoparticle can comprise a polymeric particle core, a silica particle core, or a metal, e.g., gold, particle core. Any suitable polymeric particle core can be used. In sonic embodiments, the polymeric particle core can comprise an optical shift property. In other embodiments, the polymeric particle core can comprise a metal, e.g., gold, iron oxide or a quantum dot. In still other embodiments, the inner core of the nanoparticle can comprise a biocompatible or a synthetic material, such as poly(lactic-c-glycolic acid) (PLGA), poly-lactic acid (PLA), polyglycolic acid (PGA), polyeaprolacione (PCL), poly lysine, and poly glutamie acid. In yet other embodiments, the inner core of the nanoparticle supports the outer surface.

The nanoparticle used in the present methods can comprise any suitable cellular membrane derived from a platelet or other cell type. For example, the nanoparticle used in the present methods can comprise a plasma membrane derived from a platelet. In another example, the nanoparticle used in the present methods can comprise an intracellular membrane derived from a platelet.

The nanoparticle can comprise a releasable cargo at any suitable location. For example, the releasable cargo can be located within or on the inner core, between the inner core and the outer surface, or within or on the outer surface. The release of the releasable cargo can be triggered by any suitable mechanisms. For example, the release of the releasable cargo can be triggered by a contact between the nanoparticle and the subject or cells of the subject, or by a change of a physical parameter surrounding the nanoparticle. The nanoparticle can comprise any suitable type of a releasable cargo. For example, the releasable cargo can be a metallic particle, a polymeric particle, a dendrimer particle, or an inorganic particle.

The nanoparticle used in the present methods can have ms suitable size. For example, the nanoparticle can have a diameter from about 10 nm to about 10 μm. In certain embodiments, the diameter of the nanoparticle is about 10 nm, 20 nm, 30 nm, 40 nm, 50 nm, 60 nm, 70 nm, 80 nm, 90 nm, 100 nm, 110 nm, 120 nm, 130 nm, 140 nm, 150 nm, 200 nm, 300 nm, 400 nm, 500 nm, 600 nm, 700 nm, 800nm, 900 nm, 1 μm, 2 μm, 3 μm, 4 μm, 5 μm, 6 μm, 7 μm, 8 μm, 9 μm, and 10 μm, or any sub-range within about 10 nm to about 10 μm, e.g., any range between about two of the above sizes.

The nanoparticle used in the present methods can have any suitable shape, including but not limited to, sphere, square, rectangle, triangle, circular disc, cube-like shape, cube, rectangular parallelepiped (cuboid), cone, cylinder, prism, pyramid, right-angled circular cylinder and other regular or irregular shape.

In some embodiments, the nanoparticle used in the present methods substantially lacks constituents of the platelet from which the cellular membrane is derived. For example, the nanoparticle can lack 10%, 20%, 30%, 40%, 50%, 55%, 60%, 65%, 70%, 75%, 80%, 85%, 90%, 91%, 92%, 93%, 94%, 95%, 96%, 97%, 98%, 99%, or 100% of the constituents of the platelet from which the cellular membrane is derived.

In some embodiments, the target: subject, such as a CTC, used in the present methods and compositions can isolated from the biological sample of the patient using the nanoparticles described herein, such that they substantially lack constituents of the biological sample from which the target subject is derived. For example, the target subject can lack 10%, 20%, 30%, 40%, 50%, 55%, 60%, 65%, 70%, 75%, 80%, 85%, 90%, 91%, 92%, 93%, 94%, 95%, 96%, 97%, 98%, 99%, or 100% of the constituents of the biological from which the target subject is derived.

In some embodiments, the nanoparticle used in the present methods substantially maintains the natural structural integrity or activity of the cellular membrane derived from the platelet or the constituents of the cellular membrane derived from the platelet. For example, the nanoparticle can retain 10%, 20%, 30%, 40%, 50%, 55%, 60%, 65%, 70%, 75%, 80%, 85%, 90%, 91%, 92%, 93%, 94%, 95%, 96%, 97%, 98%, 99%, or 100% of the natural structural integrity or activity for targeting a damaged or leaky vasculature in a subject or for targeting a platelet-targeting microbe.

In some embodiments, the nanoparticle used in the present methods is biocompatible or biodegradable. For example, the inner core of the nanoparticle comprises PLGA and the outer surface of the nanoparticle comprises a plasma membrane derived from the platelet.

The nanoparticle used in the present methods can have any suitable half-life in vivo. For example, the nanoparticle can have a half-life in blood circulation ire vivo for at least from about 30 minutes to about 10 hours, e.g., about 1, 2 3, 4, 5, 6, 7 8, 9, 10 hours.

The outer surface of the nanoparticle used in the present methods can further comprise a synthetic membrane. In some embodiments, the nanoparticles used in the present methods comprise a mixture of nanoparticles that comprise an outer surface comprising a platelet cellular membrane and nanoparticles that comprise an outer surface comprising a synthetic membrane. The nanoparticles that comprise an outer surface comprising a synthetic membrane may or may not be capable of targeting the CTC in a patient. In some embodiments, both the nanoparticles that comprise an outer surface comprising a platelet cellular membrane and nanoparticles that comprise an outer surface comprising a synthetic membrane are capable of targeting the CTC in a patient. In other embodiments, the nanoparticles that comprise an outer surface comprising a platelet cellular membrane is capable of targeting the CTC in a patient, but the nanoparticles that comprise an outer surface comprising a synthetic membrane is not capable of targeting the CTC in a patient.

The composition used in the present methods cart comprise the nanoparticles that comprise an outer surface comprising a platelet: cellular membrane and nanoparticles that comprise an outer surface comprising a synthetic membrane in any suitable ratio. In some embodiments, the present composition can comprise at least about 1% (w/w), 2% (w/w), 3% (w/w), 4% (w/w), 5% (w/w), 6% (w/w), 7%

(w/w), 8% (w/w), 9% (w/w), 10% (w/w), 20% (w/w), 30% (w/w), 40%, (w/w), 50% (w/w), 60% (w/w), 70% (w/w), 80% (w/w), 90% (w/w), 91% (w/w), 92% (w/w), 93% (w/w), 94% (w/w), 95% (w/w), 96% (w/w), 97% (w/w), 98% (w/w), 99% (w/w), or more of the nanoparticles that comprise an outer surface comprising a platelet cellular membrane. In other embodiments, the present composition can comprise at least about 1% (w/w), 2% (w/w), 3% (w/w), 4% (w/w), 5% (w/w), 6% (w/w), 7% (w/w), 8% (w/w), 9% (w/w), 10% (w/w), 20% (w/w), 30% (w/w), 40% (w/w), 50% (w/w), 60% (w/w), 70% (w/w), 80% (w/w), 90% (w/w), 91%, (w/w), 92% (w/w), 93% (w/w), 94% (w/w), 95% (w/w), 96% (w/w), 97% (w/w), 98% (w/w), 99% (w/w), or more of the nanoparticles that comprise an outer surface comprising a synthetic membrane. For example, the composition used in the present methods can comprise about 1-10% (w/w) of the nanoparticles that comprise an outer surface comprising a platelet cellular membrane and about 90-99% (w/w) of the nanoparticles that comprise an outer surface comprising a synthetic membrane, about 11-25% (w/w) of the nanoparticles that comprise an outer surface comprising a platelet cellular membrane and about 75-89% (w/w) of the nanoparticles that comprise an outer surface comprising a synthetic membrane, about 50% (w/w) of the nanoparticles that comprise an outer surface comprising a platelet cellular membrane and about 50% (w/w) of the nanoparticles that comprise an outer surface comprising a synthetic membrane, about 51-75% (w/w) of the nanoparticles that comprise an outer surface comprising a platelet cellular membrane and about 49-25% (w/w) of the nanoparticles that comprise an outer surface comprising a synthetic membrane, or about 90-100% (w/w) of the nanoparticles that comprise art outer surface comprising a platelet cellular membrane and about 0-10% (w/w) of the nanoparticles that comprise an outer surface comprising a synthetic membrane.

The outer surface of the nanoparticle can comprise a hybrid membrane comprising a cellular membrane derived from a platelet and a synthetic membrane, in some embodiments, the outer surface of the nanoparticle an comprise a hybrid membrane comprising at least about 5% (w/w), 6% (w/w), 7% (w/w), 8% (w/w), 9% (w/w), 10% (w/w), 20% (w/w), 30% (w/w), 40% (w/w), 50% (w/w), 60% (w/w), 70% (w/w), 80% (w/w), 90% (w/w), 9.1% (w/w), 92% (w/w), 93% (w/w), 94% (w/w), 95% (w/w), 96% (w/w), 97% (w/w), 98% (w/w), 99% (w/w) of a cellular membrane derived from a platelet. In other embodiments, the outer surface. of the nanoparticle can comprise a hybrid membrane comprising at least about 1% (w/w), 2% (w/w), 3% (w/w), 4% (w/w), 5% (w/w), 6% (w/w), 7% (w/w), 8% (w/w), 9% (w/w), 10% (w/w), 20% (w/w), 30% (w/w), 40% (w/w), 50% (w/w), 60% (w/w), 70% (w/w), 80% (w/w), 90% (w/w), 91% (w/w), 92% (w/w), 93% (w/w), 94% (w/w), 95% (w/w) of a synthetic membrane. For example, the outer surface of the nanoparticle can comprise a hybrid membrane comprising about 5-10% (w/w) of a cellular membrane derived from a platelet and about 90-95% (w/w) of a synthetic membrane, about 11-25% (w/w) of a cellular membrane derived from a platelet and about 75-89% (w/w) of a synthetic membrane, about 50% (w/w) of a cellular membrane derived from a platelet and about 50% (w/w) of a synthetic membrane, about 51-75% (w/w) of a cellular membrane derived from a platelet and about 49-25% (w/w) of a synthetic membrane, or about 90-99% (w/w) of a cellular membrane derived from a platelet and about 1-10% (w/w) of a synthetic membrane.

In some embodiments, the nanoparticle used in the present methods substantially lacks immunogenicity to the subject, e.g., a mammal. For example, the cellular membrane can be derived from a platelet from the same species of the subject. In another example, the subject is a human and the cellular membrane is derived from a human platelet. In some embodiments, the cellular membrane can be derived from a platelet of the mammal to be treated. For example, the cellular membrane can be, derived from a platelet of the human to be treated.

One aspect of the invention relates to the preparation of polymeric nanoparticles enclosed in the plasma membrane of human platelets, which are a unique population of cellular fragments that adhere to a variety of disease-relevant substrates. The resulting nanoparticles possess a right-side-out unilamellar membrane coating functionalized with immunomodulatory and adhesion antigens associated with platelets. As compared to uncoated particles, the platelet membrane-cloaked nanoparticles have reduced cellular uptake by macrophage-like cells and are absent of particle-induced complement activation in autologous human plasma. The cloaked nanoparticles also display platelet-mimicking properties as well as enhanced binding to platelet-adhering pathogens. In a mouse model of systemic bacterial infection, docetaxel and vancomycin, respectively, show enhanced therapeutic efficacy when delivered by the platelet-mimetic nanoparticles. The multifaceted biointerfacing enabled by the platelet membrane cloaking method provides a new approach in developing functional nanoparticles for disease-targeted delivery.

EXAMPLES

Example 1: PNP Preparation and Characterization

PNPs were prepared following a previously published protocol[23]. Briefly, human platelet membranes were collected and fused onto polylactic-co-glycolic acid) (PLGA) cores with a diameter of 100±3.1 nm. The resulting PNPs had a diameter of 115±2.3 nm (FIG. 1A). About 15 nm increase of the diameter was consistent with the addition of a cell membrane onto PLGA cores. Following the coating, the surface charge increased from −4.3±7.1 mV of the core to −30.4±6.6 mV of PNPs, likely due to the charge screening from platelet membrane. Transmission electron microscopy (TEM) visualization showed the formation of distinctive core-shell structures consistent with a membrane shell coated over PLGA cores (FIG. 1B). Meanwhile, a right-side out membrane orientation on PNPs was verified by immunogold staining with antibodies targeting extracellular domain of CD47 (FIG. 1C). In addition, compared to platelets, PNPs expressed a higher level of P-selectin, an activation marker critical for CTC binding (FIG. 1D). The activation was likely due to the freeze-thaw cycles during membrane derivation. Enhanced colloidal stability was also observed with PNPs compared to bare NP cores, attributable to the stabilizing, effect from platelet membrane's hydrophilic surface glycans (FIG. 1E). Furthermore, translocation of platelet membrane protein content onto the nanopartieies was confirmed with western blotting (FIG. 1F). Together, these results demonstrate the successful formulation of PNPs.

Specifically, FIGS. 1A-1F show preparation and characterization of PNPs. FIG. 1A shows size and surface zeta potential of PLGA cores and PNPs measured with dynamic light scattering (n=3). FIG. 1B shows TEM images of bare cores and PNPs. Scale bar=100 nm. FIG. 1C shows TEM image of PN Ps primary-stained with extracellular domain-specific anti-CD47, and secondary-stained with an immunogold. Scale bar=40 nm. FIG. 1D shows PNPs and platelets with equivalent amount of membranes were compared for levels of P-selectin expression. FIG. 1E shows particle diameter of bare NP cores and PNPs in water and in 1× PBS (n=3). FIG. 1F shows representative protein bands resolved using western blotting.

Example 2: PNPs Adhering to Broad-Spectrum Cancer Cells

To study PNP adherence, cancer cell lines were selected including AGS (stomach adenocarcinoma). SK-OV-3 (ovarian cystadenocarcinoma), H1299 (non-small cell lung carcinoma), and HCT 116 (colorectal carcinoma). PNPs (0.1 mg/mL in 1× PBS) labeled with DiD dye (excitation/emission=644/665 nm) were added to cell suspensions ($10^6$ cells/mL). RBC membrane coated nanoparticles (RBC-NPs) were used as a negative control. Mixtures were incubated for 30 minutes at 4° C. followed by washing to remove unbound nanoparticles. PNP adherence was measured with flow cytometry. Regardless of the underlying binding mechanisms, PNPs adhered to all cancer cell lines tested (FIG. 2).

Figure 2:
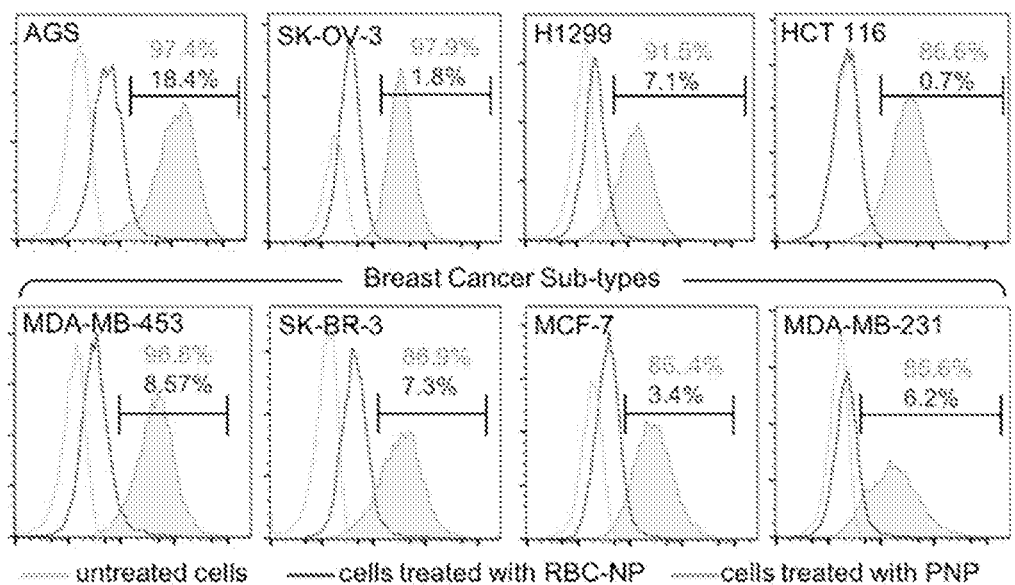
FIG. 2 shows PNPs adhering to abroad-spectrum of cancer cells.

Specifically, FIG. 2, shows PNPs adhering to a broad-spectrum of cancer cells. Flow cytometric histograms showing enhanced fluorescence intensity from a variety of cancer cell lines incubated with PNPB compared to those incubated with RBC-NPs or without treatment. Untreated cells are shown in light gray, cells treated with RBC-NP are shown in dark gray, and cells treated with PNP are shown in medium gray and shaded under the curve.

PNPs against different subtypes of breast cancer were further tested. Breast cancer cell lines including MDA-MB-453, SK-BR-3, MCF-7, and MDA-MB-231 are known to activate and bind with platelets, despite their varying metastatic potentials[16, 24, 25]. Preliminary results demonstrated that PNPs inherited the properties of platelets to bind with all breast cancer cell lines tested. This ability demonstrates the potential of PNPs as a broad-spectrum enrichment tool for CTCs.

Example 3: PNPs Enriching Cancer Cells from In Vitro Cell Mixtures

Figure 3:
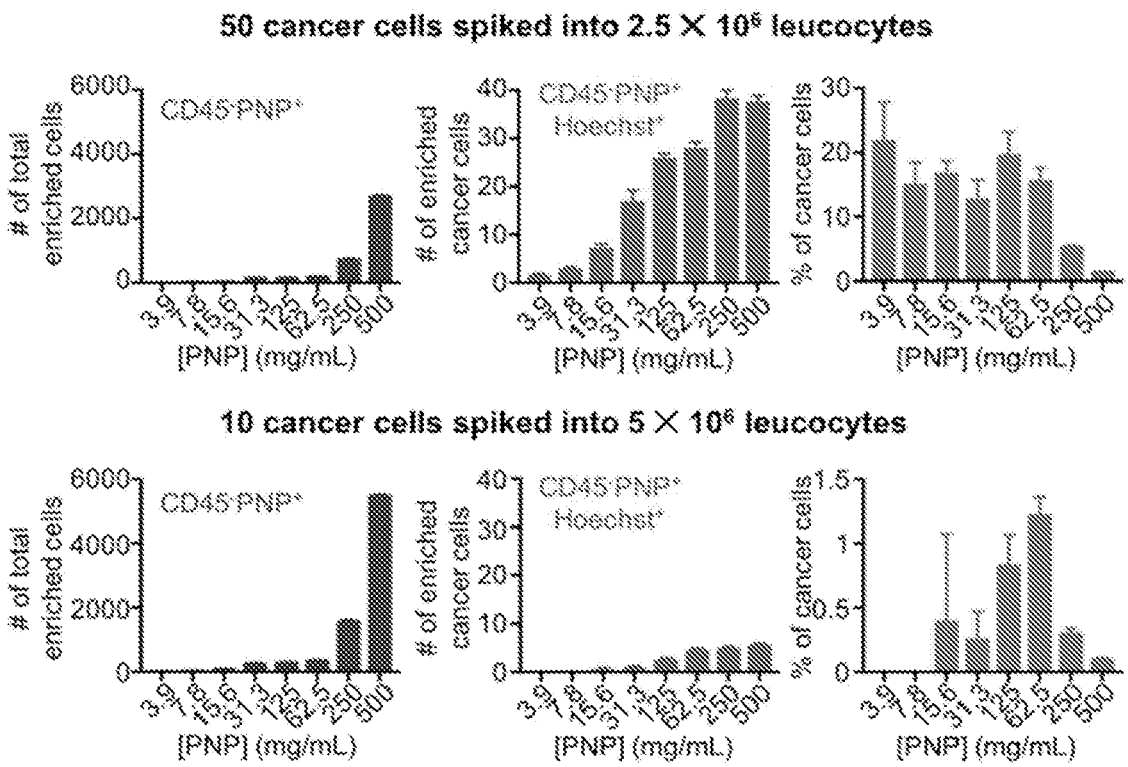
FIG. 3 shows PNPs enriching cancer cells from in vitro mixtures with leucocytes.

Cancer cell-leucocyte mixtures were used to analyze the enrichment efficiency with flow cytometry. MDA-MB-453 cells were mixed with leucocytes at ratios of 50: $2.5 \times 10^6$ (high) and 10: $5 \times 10^6$ (low), respectively. PNPs ranging from 19 to 500 μg/mL were added to the cell mixtures. Samples were incubated for 30 min at 4° C. and washed with PBS to remove unbound PNPs. In flow cytometry analysis, all enriched cells (blue, $PNP^+CD45^-$) and all enriched cancer cells (red, $PNP^+CD45^-Hoechst^+$) were counted. The percentage of cancer cells was plotted against PNP concentrations (purple). PNPs dramatically increased the percentage of cancer cells to over 20% at the high ratio and over 1% at the low ratio, corresponding to an enrichment factor (i.e. fold increase of cancer cell concentration in cell mixtures) of $10^5$ and $5 \times 10^3$, respectively (FIG. 3). This study demonstrated the capability of PNPs to enrich CTCs in cell mixtures and the enrichment efficiency depended on total cells, CTC to leucocyte ratio, and PNP concentration.

Specifically, FIG. 3 shows PNPs enriching cancer cells from in vitro mixtures with leucocytes. MDA-MB-453 cells (stained with Hoechst 33342) were mixed with leucocytes (stained with PE-anti-CD45) at different ratios. PNPs (labeled with DiD) ranging from 3.9 to 500 μg/mL, were added to the mixtures. Total enriched cells ($PNP^+CD45^-$) and enriched cancer cells ($PNP^+CD45^-Hoechst^+$) were counted. Percentage of cancer cells in enriched cell samples were calculated.

Example 4: PAPs Enriching Cancer Cells from In Vivo Tumor Xenograft

Figure 4:
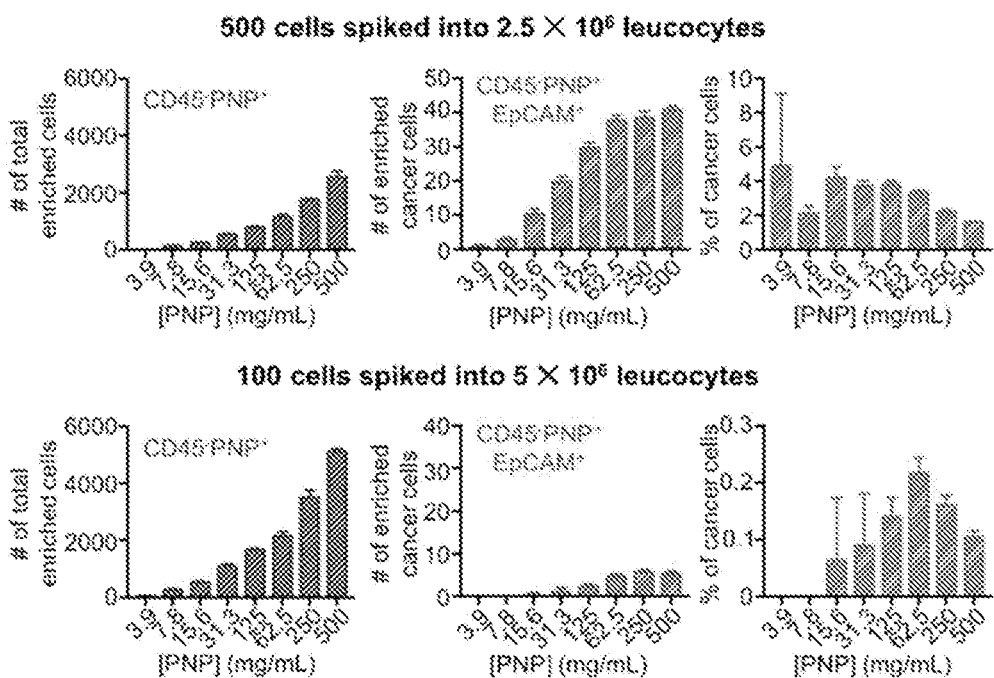
FIG. 4 shows PNPs enriching cancer cells from tumor xenograft.

To further demonstrate the potential of PNPs for CTC enrichment, cell suspensions were derived from tumor of MDA-MB-453 mouse xenograft. Cells from the tumor were mixed with leucocytes at: two ratios: $500:2.5 \times 10^6$ (high) and $100:5 \times 10^6$ (low), respectively. Cells were spiked with leucocytes and stained with PNPs, anit-CD45, and EpCAM. In flow cytometry analysis, all enriched cells ($PNP^+CD45^-$) were counted, from which $EpCAM^+$ cells were also counted. The percentage of $EpCAM^+$ was plotted against. PNP concentrations. PNPs significantly increased the percentage of $EpCAM^+$ cells over 4% at the high ratio and over 0.2% at the low ratio, corresponding to an enrichment factor of $10^4$ and $2.5 \times 10^3$, respectively (FIG. 4). Specifically, FIG. 4, shows PNPs enriching cancer cells from tumor xenograft. cells from MDA-MB-453 xenograft (stained with anti-EpCAM) were mixed with leucocytes (stained with PE-anti-CD45) at different ratios. PNPs (labeled with DiD) ranging from 3.9 to 500 μg/mL were added to the mixtures. Total enriched cells (left graphs, $PNP^+CD45^-$) and enriched cancer cells (middle graphs, $PNP^+CD45^-EpCAM^+$) were counted. Percentage of cancer cells in enriched cell samples were calculated (right graphs).

Overall, by using cells from mouse xenografts, the capability of PNPs for CTC enrichment was further demonstrated. Optimization strategies aimed to further improve the enrichment efficiency for scRNA-seg are described below.

Example 5: Identifying Genes Distinguishing Cancers.

The power of integrating multiple omics data to discriminate disease from normal patients was previously demonstrator[57]. In particular, a novel method was developed to significantly expand the coverage of DNA methylation data measure bylumina 450K array (18 times) in patient samples[21, 58]. The expanded methylome data allowed successful identification of the genes that best characterize the core cancer transcriptome. 4123 tripled -evidenced genes were identified that show (1) differential gene expression and (2) DNA methylation as well as (3) associated with somatic mutations in the pan-cancer analysis using the TCCA data[20]. These genes can robustly distinguish cancer from normal samples as well as different cancers using bulk RNA-seq data (FIGS. 5A-5C).

Figure 5A:
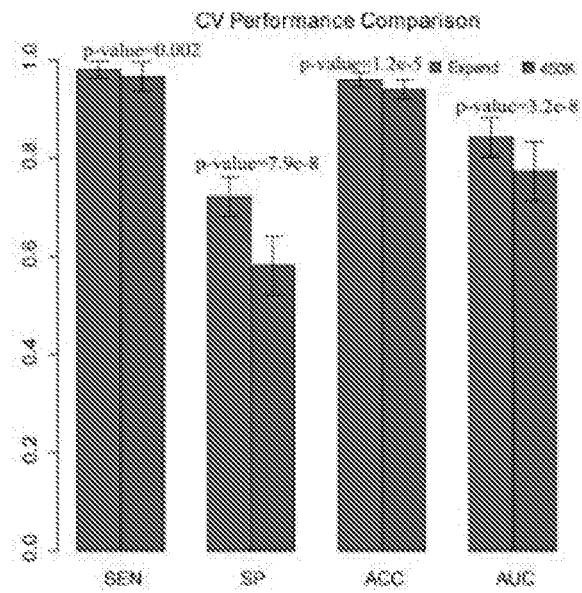
FIGS. 5A 5C show diagnosis and prognosis analysis using the triple-evidenced genes.
Figure 5B:
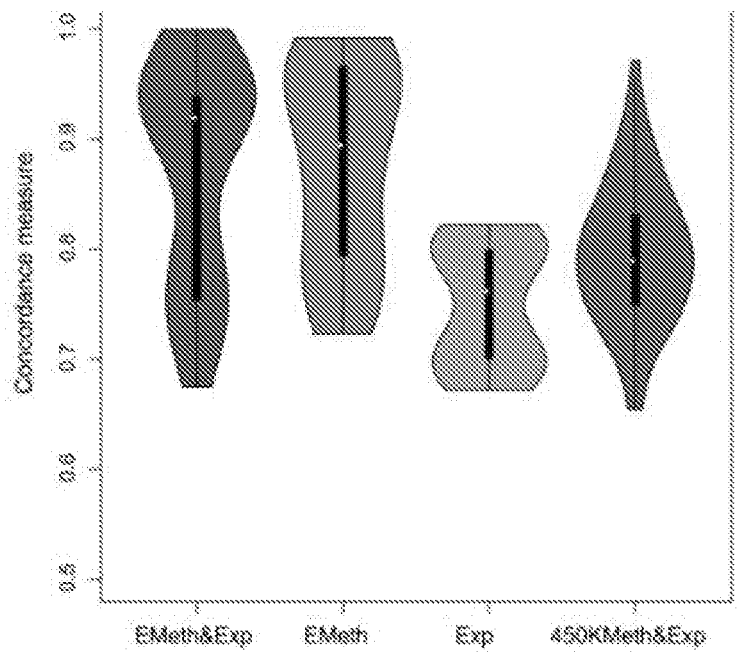
Figure 5C:
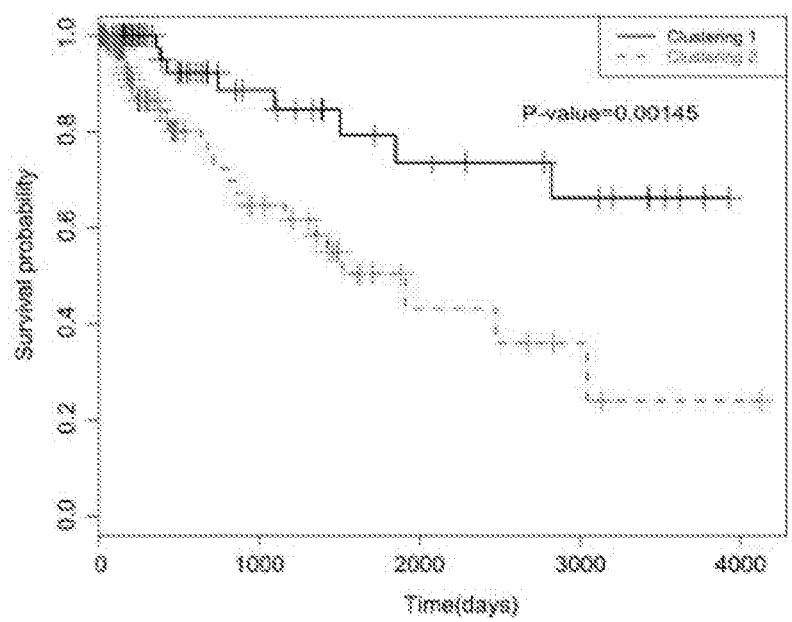

Specifically, FIGS. 5A-5C. demonstrate diagnosis and prognosis analysis using the triple-evidenced genes. FIG. 5A shows diagnostic analysis to distinguish cancers from normal samples using the triple-evidenced genes in 10-fold cross validations (t-test). SE, sensitivity; SP, specificity; ACC, accuracy; AUC, Area Under ROC Curve. FIG. 5B shows the boxplots of the concordances using expression data alone, expanded methylation data alone, both expression and expanded methylation data or both expression and the original 450 K data on COAD (repeating for 100 times). A hierarchical clustered heatmap was created (not shown) using the selected features (both gene expression and methylated loci) in prognosis analysis. Both the tumor samples and the features were clustered, and the log2 (RPKM) of gene expression value was normalized to [0,1]. FIG. 5C shows the Kaplan-Meier survival plot of the two clustered samples.

The Heracles framework was developed (FIG. 5A) to determine whether the single cells captured by PNPs are cancer or normal cells and, if cancer cells, the cancer type(s). The workflow starts with performing SMART-seq[18, 53, 54] experiments on the PNP-cells. The processed and normalized scRNA-seq data are input to a hierarchical classification model. First, the cell is classified as either normal or cancer at the top hierarchy "Cancer versus Normal". If cancer, the cell is classified in the next hierarchy "Cancer versus Cancer" to a specific cancer type. A new strategy was developed to transfer the transcriptomic signature identified from bulk to single cell RNA-seq data. Despite the tumor heterogeneity issue, the hulk data is very helpful to select gene features for classification. Previously, the power of integrating multiple unties data to discriminate disease from normal patients was shown[55]. In particular, a novel method to significantly expand the coverage of DNA methylation data measure by Illumina 450K array in patient samples was developed[22, 56]. Encouraged by the success of these studies, 4123 tripled-evidenced genes were identified that show (1) differential gene expression and (2) DNA methylation as well as (3) associated with somatic mutations in the pan-cancer analysis using the TCGA data[20]. These genes can robustly distinguish cancer from normal samples as well as different cancers using bulk RNA-seq data[20].

Due to biological or technical noise, some of these feature genes may not be robustly covered in single cell experiments and thus may be removed. Importantly, the expression patterns of the selected feature genes should be the same in both bulk and single cell measurements. Using this strategy, feature genes were selected for each hierarchy in the classification model.

Example 6: "Cancer Verus Normal" and "Cancer Verus Cancer" Classification

Cancer versus Normal classification. Models were trained using the, bulk RNA-seq data of matched tissues, normal from GTEx[57] and cancer from TCGA[58] databases, respectively. The following tissues were considered: bladder, breast, colon, colorectal, esophagus, brain, kidney, ovary, prostate, lung, stomach, pancreas, thyroid, skin, blood, testis and cervix. To identify the transcriptomic signature suitable to analyze scRNA-seq, high-quality Drop-seq[59] data were obtained on 82 cells including breast normal (MCF-10a cell line) and cancer cells (MDA-MB-453, MCF7, SK-BR-3). These single cell data were normalized and selected 1002 out of 4123 triple-evidenced genes as the features for classification. These 1002 genes are the most variable triple evidenced genes across single cells and the differences of their mean expression values between normal and cancer samples in hull and single cell data have the same sign. They are enriched with functions that are broadly related to cell proliferation and tumorigenesis relevant pathways such as PI3K/AKT/mTOR pathway; importantly, these pathways are not specific to breast cancer or tissue. Taken together, the matched normal and cancer tissue should remove or at least reduce the tissue specificity, and these 1002 genes can thus represent the transcriptomic signature distinguishing normal from cancer samples.

"Cancer versus Cancer" classification. If a single cell is classified as cancer, its cancer type is next determined. Breast, stomach, ovary and lung cancers were the initial focus. The triple-evidenced genes specific for each of these cancers were selected from the TCGA RNA-seq data. The Drop-seq[59] data on these tour cancers were venerated using cancer cell lines (breast MCF7, stomach AGS, ovary SK-OV-3 and lung H1299, see below). The triple-evidenced were selected genes based on: (1) the most variable across these four cancers; (2) the differences of their mean expression values between the cancer under consideration and the other cancers in bulk and in single cell data have the same sign.

Building classification model. For both classification tasks, 100 random forest models were trained with regularization using the bulk RNA-seq data, i.e. pooled 7200 normal from GTEx and 9330 cancer samples from TCGA for "Cancer versus Normal" and individual cancers in "Cancer versus Cancer" classification. Each single cell's probability of being cancer or a specific cancer type was independently calculated by each of the 100 random forest models. The median of the 100 probabilities was taken as a group voting score. In "Cancer versus Normal", a single cell with a group voting score >0.6 was considered as "cancer", <0.4 as "Normal", and in between as "Undetermined". In "Cancer versus Cancer", the group voting score was calculated for each individual cancer type. A Poisson test was conducted on all the scores of a single cell. The single cell was assigned to the cancer(s) with p-value(s) less than a cutoff of $10^{-3}$. A single cell could be assigned to multiple cancer types if their scores were all significant and suggested possible metastasis or multiple origins of cancer. If there was no significant p-value, the single cell was labeled as "Undetermined", suggesting a cancer type not included in the training set.

Performance assessment. Heracles was validated on the Drop-seq[59] data of four cancer cell lines, stomach (86 AGS cells), breast (68 MCF7 cells). ovarian (76 SIC-OV-3 cells) and lung (45 H1299 cells), as well as PBMC (2200 cells released by 10× Genomics and obtained from their website). Note that these data were independently generated and none of them were used for model training.

"Cancer versus Normal" assessment. The cancer was mixed with PBMC cells at 8 different ratios by random sampling with replacement and enrichment level ranged from 0.01% (10/100000) to 30% (300/1000). This was repeated 100 times for each cancer type (FIGS. 6B-5E), Similarly, to mimic the scenario of multiple cancer types existing in the circulation, all the cancer cells were pooled and then performed 100 times of random mix with PBMC cells (FIGS. 6F-5G). Overall, the model performed very well. The higher the enrichment, the smaller the classification variation. This simulated data shows that the current model can reliably detect CTCs above 0.01% enrichment that can be achieved using PNP.

"Cancer versus Cancer" assessment, For the cells classified as cancer (80/86 AGS, 67/68 MCF7, 70/76 SK-OV-3, 41/45 H1299 cells), they were further classified to specific cancer type using nested five-fold cross validations (FIG. 6H). The overall performance was satisfactory.

Figure 6A:
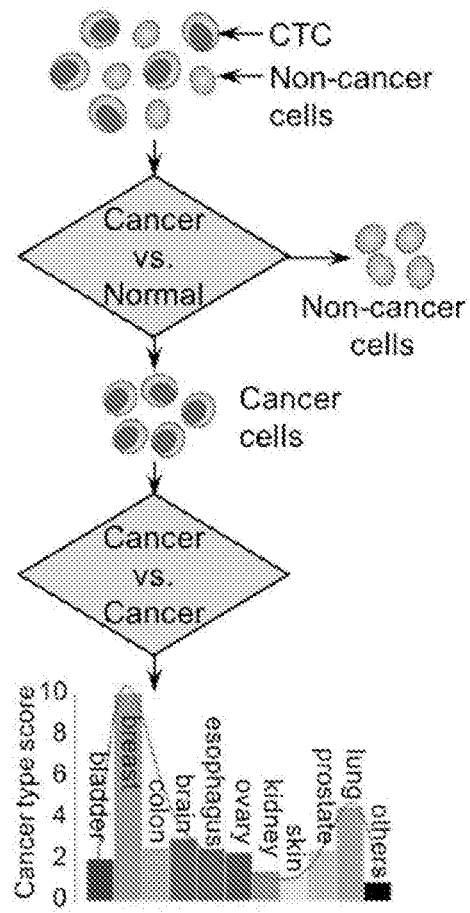
Figures 6B, 6C, 6D:
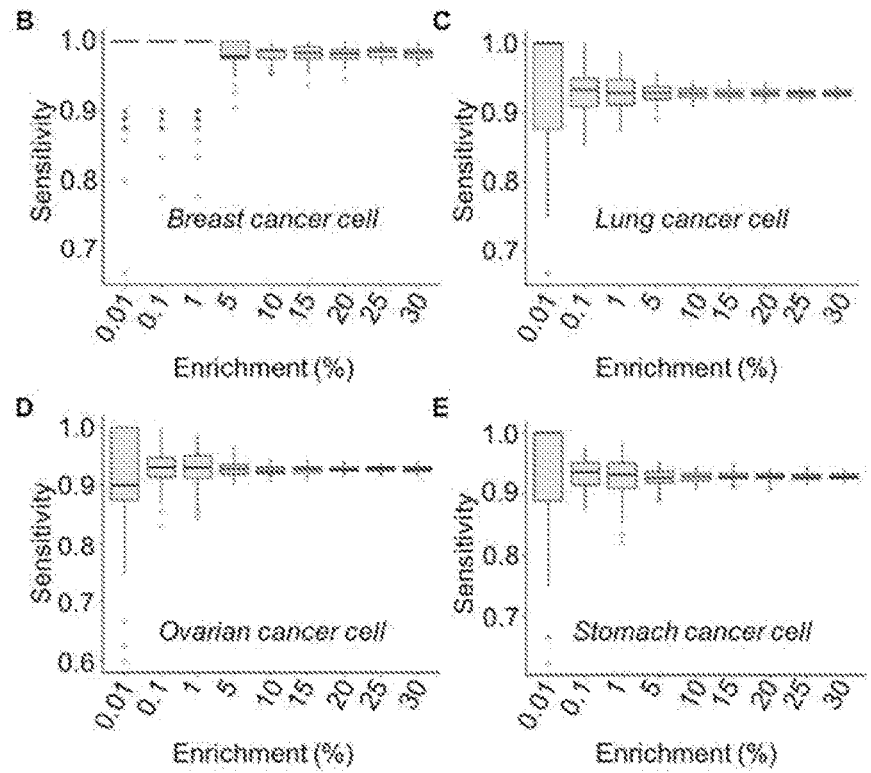
Figures 6D, 6F:
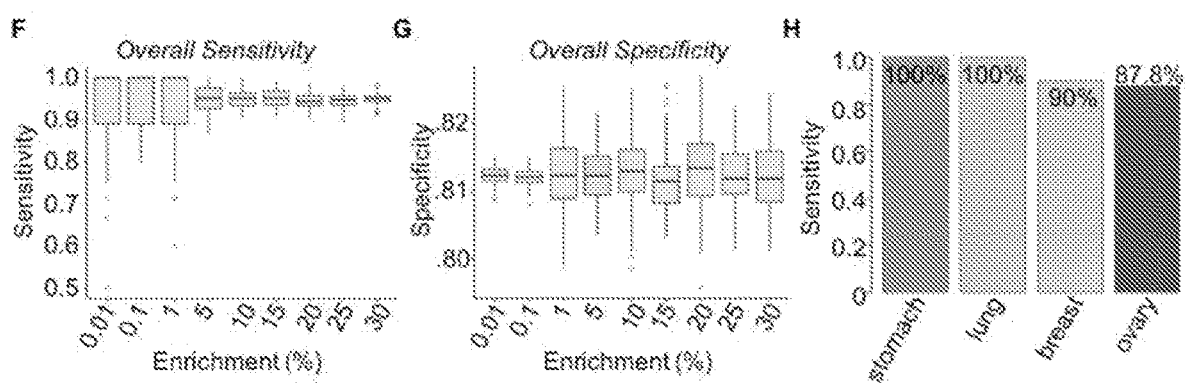

Specifically, FIGS. 6A-6H show the Heracles framework. FIG. 6A shows that for a given single cell, it is classified as cancer or normal and, if cancer, a specific cancer type. (FIGS. 68-6E). Sensitivity for the four cancer types considered in the current model. Overall sensitivity (FIG. 6F) and specificity (FIG. 6G) for "Cancer versus Normal" classification. FIG. 6H shows sensitivity for "Cancer versus Cancer" classification.

Example 7: Patient Blood Sample Processing and Enrichment

Blood sample (5 mL) from a patient with diagnosis of stage IIA and triple negative breast cancer was immediately processed upon receiving, with 25 ML suspension buffer added (1× PBS containing 2 mM EDTA, 25 mM HEPES, and 1% heat inactivated FBS) and washed with centrifugation (300 g for 5 min) repeatedly until a clear white buffy coat above the RBC layer was observed. The buffy coat was carefully transferred into RBC lysis buffer to remove residual RBCs. Remaining cells were re-suspended into 100 μL and stained with PNPs, PE labeled anti-CD45 antibodies, Pacific Blue labeled anti-EpCAM, and Calcein-AM. During the sorting, 5036 PNP$^+$CD45$^-$ cells were collected from a total of 5×10$^6$ cells (an enrichment factor of 10$^3$), including 335 viable cells (Calcein AM$^+$). Among Calcein AM$^+$ cells. 25 EpCAM$^+$ and 310 EpCAM$^-$ cells were identified, respectively (FIGS. 7A-7B).

Figures 7A, 7B:
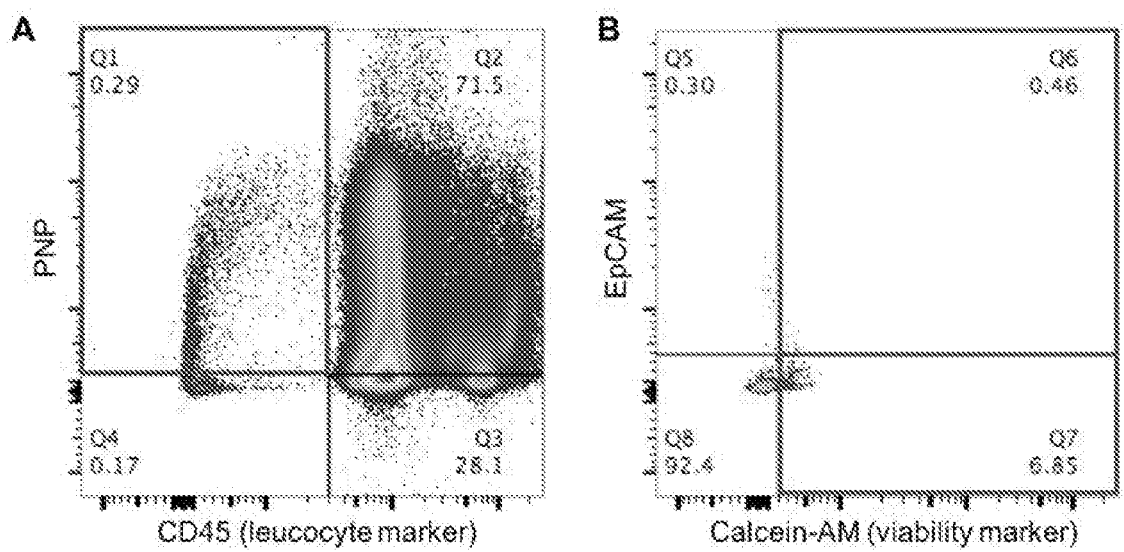
FIGS. 7A-7B show enrichment of cancer cells from a cancer patient's blood sample.

Specifically, FIGS. 7A-7B show enrichment of cancer cells from a cancer patient's blood sample. The blood sample was processed to remove all RBCs and then stained with PNP, anti-CD45, anti-EpCAM, and Calcein-AM. In FIG. 7A, cells were positively selected with PNP and leucocyte were depleted with CD45. In FIG. 7B, viable cells (Calcein-AM+) from FIG. 7A were selected for sequencing.

Example 8: Spike-In Analysis

Figures 8A, 8B:
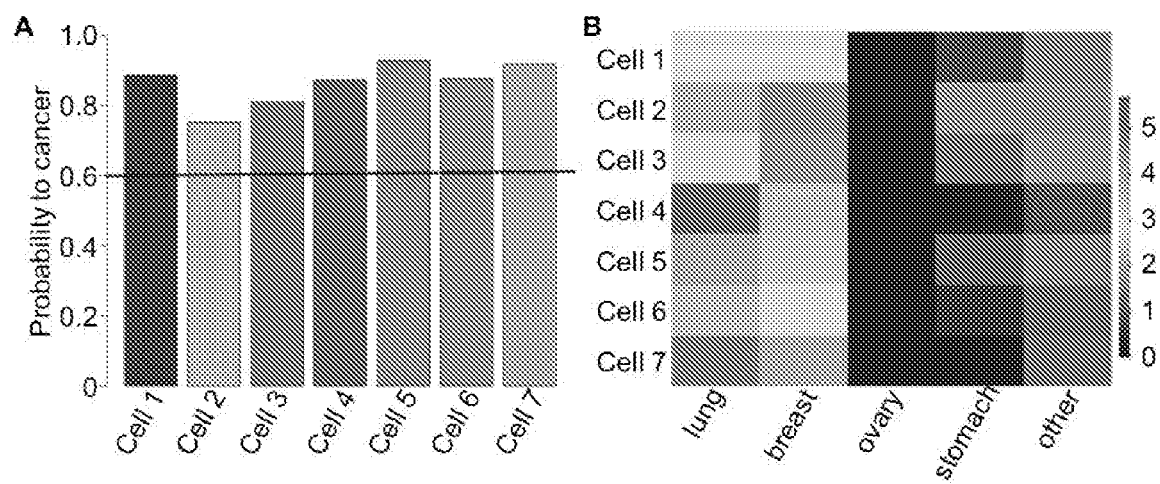
FIGS. 8A-8B show the spike-in analysis.

~30 MDA-MR-231 breast cancer cells were spiked into 5 ml patient blood and retrieved 7 cells using PNP for SMART-seq analysis. In "Cancer versus Normal" layer, all the cells were classified as cancer (FIG. 8A). In "Cancer versus Cancer" layer, comparable significant p-values obtained from Poisson test for breast and lung cancers and insignificant p-values for ovarian and stomach cancers were observed (FIG. 8B). MDA-MB-231 is known for its high aggressive and metastatic properties and its transcriptome patterns are highly similar to lung cancer[70,71]. This result indicates the method can detect primary and metastatic sites.

Specifically, FIGS. 8A-8B show the spike-in analysis. FIG. 8A shows cancer versus normal probability. FIG. 8B shows cancer versus cancer probability (log2).

In conclusion, combining the unique PNP enrichment technology and the novel single cell analysis technology has proven to be effective. We have demonstrated high sensitivity and specificity of our approach in retrieving cancer cells mixed in a very low percentage with leucocytes and in cancer patient blood. Embodiments of the presently disclosed technology could lead to the development of new and robust approaches to detecting CTCs without the aid of specific surface markers and determining cancer origin without prior information.

While PNPs have been used for the enrichment and detection CTCs, the same concept can be readily generalized to the cell types. By using nanoparticles coated with the appropriate type of cell membrane, target subjects with a specific bindina, affinity with the cell membrane can be enriched and detected in a similar fashion, thereby enabling subsequent single cell analysis. For example, by using cancer cell membrane-coated nanoparticles, immune cells in the blood stream that have a binding affinity with the cancer cells can be enriched. Profiling of the enriched immune cells can then be used to predict cancer. For another example, by using bacterial membrane-coated nanoparticles, immune cells or human host cells that have a specific binding affinity with the pathogen can be identified. Thus, embodiments of the presently disclosed technology could also lead to the development of early detection and prevention or treatment of cancer and other types of human diseases.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

REFERENCES

1. Pantel, K. & Speicher, M. R. The biology of circulating tumor cells. Oncogene 35, 1216-4224 (2016).
2. D. S., Maheswaran, S. & Haber, D. A. A conduit to metastasis: circulating tumor cell biology. Genes Dev 31, 1827-1840 (2017).
3. Lin, E., Cao, T., Nagrath, S. & King, M. R. Circulating Tumor Cells: Diagnostic and Therapeutic Applications, Annu Rev Biomed Eng 20, 329-352 (2018).
4. Rack, B. et al. Circulating tumor cells predict survival in early average-to-high risk breast cancer patients. J Natl Cancer Inst 106 (2014).
5. Ilie, M. et al. "Sentinel" circulating tumor cells allow early diagnosis of lung cancer in patients with chronic obstructive pulmonary disease. PLoS One 9, e111597 (2014).
6. Shaw Bagnall, J. et al. Deformability of Tumor Cells versus Blood Cells. Sci Rep 5, 18542 (2015).
7. Liu, H. Y. et al. Improved method increases sensitivity for circulating hepatocellular carcinoma cells. World J Gastroenterol 21, 2918-2925 (2015).
8. Reid, A. L., Freeman, J. B., Millward, M., Ziman, M. & Gray, E. S. Detection of BRAF-V600E and V600K in melanoma circulating tumour cell s by droplet digital PCR. Clin Biochem 48, 999-1002 (2015).
9. Hou, H. W. et al. Isolation and retrieval of circulating tumor cells using centrifugal forces. Sci Rep 3, 1259 (2013).
10. Allard, W. J., et al. Tumor cells circulate in the peripheral blood of all major carcinomas but not in healthy subjects or patients with nonmalignant diseases. Clin Cancer Res 10, 6897-6904 (2004).
11. Ozkumur, E. et al. Inertial focusing for tumor antigen-dependent and -independent sorting of rare circulating tumor cells. Sci Transl Med 5, 179ra147 (2013).
12. Karabacak, N. M. et al. Microfluidic, marker-free isolation of circulating tumor cells from blood samples, Nat Protoc 9, 694-710 (2014).

13. Yu, M, et al. Circulating breast tumor cells exhibit dynamic changes in epithelial and mesenchymal composition. Science 339, 580-584 (2013).
14. Nieswandt, B., Hafner, M., Echtenacher, B. & Mannel, D. N. Lvsis of tumor cells by natural killer cells in mice is impeded by platelets. Cancer Res 59, 1295-1300 (1999).
15. Velez, J. et al. Platelets promote mitochondrial uncoupling and resistance to apoptosis in leukemia cells: a novel paradigm for the bone marrow microenvironment. Cancer Microenviron 7, 79-90 (2014).
16. Franco, A. T., Corken, A. & Ware, J. Platelets at the interface of thrombosis, inflammation, and cancer. Blood 126, 582-588 (2015).
17. Powell, A.A. et al. Single cell profiling of circulating tumor cells: transcriptional heterogeneity and diversity from breast cancer cell lines. PLoS One 7, e33788 (2012).
18. Ramskold, D. et al. Full-length mRNA-Seq from single-cell levels of RNA and individual circulating tumor cells. Nat Biotechnol 30, 777-782 (2012).
19. Miyamoto, D. T. et al. RNA-Seq of single prostate CTCs implicates noncanonical Wnt signaling in anti-androgen resistance. Science 349, 1351-1356 (2015).
20. Fan, S. et al. Integrative an with expanded DNA methylation data reveals common key regulators and pathways in cancers Genome Medicine 4, 2 (2019).
21. Whitaker, J. W. et al. Integrative omics analysis of rheumatoid arthritis identifies non-obvious therapeutic targets. PLoS One 10, e0124254 (2015).
22. Fan, S., Li, C., Ai, R., Firestein, G. S. & Wang, W. Computationally expanding Infinium HumanMethylation450 BeadChip array data to reveal distinct DNA methylation patterns of rheumatoid arthritis. Bioinformatics (2016).
23. Hu, C.-M. J. et al. Nanoparticle biointerfacing by platelet membrane cloaking, Nature 526, 118-121 (2015).
24. Felding-Habermann, B. et. al. Integrin activation controls metastasis in human breast cancer. Proc. Natl, Acad. Sci. U.S.A. 98, 1853-1858 (2001).
25. Zara, M. et al. Molecular mechanisms of platelet activation and aggregation induced by breast cancer cells. Cell. Signal. 48, 45-53 (2018).
26. Labelle, M., Begum, S. & Hynes, R. O. Direct Signaling between Platelets and Cancer Cells Induces an Epithelial-Mesenchymal-Like Transition and Promotes Metastasis, Cancer Cell 20, 576-590 (2011).
27. Bambace, N. M. & Holmes, C. E. The platelet contribution to cancer progression, J. Thromb. Haemost. 9, 237-249 (2011).
28. Nobili, M., Sheriff, J., Morbiducci, U., Redaelli, A. & Bluestein, D. Platelet activation due to hemodynamic shear stresses: Damage accumulation model and comparison to in vitro measurements. ASAIO J. 54, 64-72 (2008).
29 Plantureux, L. et al. Impacts of Cancer on Platelet Production, Activation and Education and Mechanisms of Cancer-Associated Thrombosis, Cancers (Basel) 10, article number 441 (2018).
30. Stefanini, L. & Bergmeier, W. Negative regulators of platelet activation and adhesion, J. Thromb. Haemost. 16, 220-230 (2018).
31. Estevez, D. & Du, X. P. New Concepts and Mechanisms at Platelet Activation Signaling, Physiology 32, 162-177 (2017).
32. Shi, L. et al. Predictable Resistance and Overall Survival of Gemcitabine/Cisplatin by Platelet Activation Index in Non-Small Cell Lung Cancer. Med. Sci. Monit. 24, 8655-8668 (2018).
33. Yang. J., Furie, B. C. & Furie, B. The biology of P-selectin glycoprotein ligand-1: Its role as a selectin counterreceptor in leukocyte-endothelial and leukocyte-platelet interaction. Thromb. Haemost, 81, 1-7 (1999).
34. Burdorf, L., Riner, A. & Rybak, E. Platelet sequestration and activation during. GalTKO.hCD46 pig lung perfusion by human blood is primarily mediated by GPIb, GPIIb/IIIa, and von Willebrand Factor (vol 23, pg 222, 2016). Xenotransplantation 23, 423-423 (2016).
35. Bruserud, O. The Snake Venom Rhodoeytin from Calloselasma rhodostoma—A Clinically Important Toxin and a Useful Experimental Tool for Studies of C-Type Lectin-like Receptor 2 (CLEC-2). Toxins (Basel) 5, 665-674 (2013).
36. Luk, B. T., et al. Interfacial interactions between natural RBC membranes and synthetic polymeric nanoparticles. Nanoscale 6, 2730-2737 (2014).
37. Hu, C. M. J. et al. 'Marker-of-self' functionalization of nanoscale particles through a top-down cellular membrane coating approach. Nanoscale 5, 2664-2668 (2013).
38. Rosenberg, R. et al. Comparison of two density gradient centrifugation systems for the enrichment of disseminated tumor cells in blood. Cytometry 49, 150-158 (2002).
39. Lagoudianakis, E. E. et al. Detection of Epithelial Cells by RT-PCR Targeting CEA, CK20, and TEM-8 in Colorectal Carcinoma Patients Using OncoQuick Density Gradient Centrifugation System, J. Surg. Res. 155, 183-190 (2009).
40. Sharma, S. et al. Circulating tumor cell isolation, culture, and downstream molecular analysis. Biotechnol. Adv. 36, 1063-1078 (2018).
41. Colella, R., Jackson, T. & Goodwyn, E. Matrigel (R) invasion by the prostate cancer cell lines, PCb 3 and DU145, and cathepsin L+B activity. Biotech. Histochem. 79, 121-127 (2004).
42. Kobayashi, M. et al, Ovarian cancer cell invasiveness is associated with discordant exosomal sequestration of Let-7 miRNA and miR-200. J. Transl. Med. 12, article number 4 (2014).
43. Francia, G., Cruz-Munoz, W., Man, S., Xu, P. & Kerbel, R. S. Mouse models of advanced spontaneous metastasis for experimental therapeutics. Nature Reviews Cancer 11, 135-141 (2011).
44. Tripathi, S., Belkacemi, L., Cheung, M. S. & Bose, R. N. Correlation between Gene Variants, Signaling Pathways, and Efficacy of Chemotherapy Drugs against Colon Cancers. Cancer Inform. 15, 1-13 (2016).
45. Park, K. C. et al. Genetic changes in the transonning growth-fector beta (TGF-beta) type-II receptor gene in human gastric cancer cells: correlation with sensitivity to growth inhibition by TGF-beta, Proc. Natl. Acad. Sci. U.S.A. 91, 8772-8776 (1994).
46. Kennecke, H. et al. Metastatic Behavior of Breast: Cancer Subtypes. J. Clin. Oncol. 28, 3271-3277 (2010).
47. Feldman, B. J. & Feldman. D. The development of androgen-independent prostate cancer. Nature Reviews Cancer 1, 34-45 (2001).
48. Sharpless, N. E. DePinho, R. A. Model organisms—The mighty mouse: genetically engineered mouse models in cancer drug development. Nature Reviews Drug Discovery 5, 741-754 (2006).
49. Esteva-Font, C., Jin, B. J. & Verkman, A. S. Aquaporin-1 gene deletion reduces breast tumor growth and lung metastasis in tumor-producing MMTV-PyVT mice. FASEB J. 28, 1446-1453 (2014).
50. Moser, A. R., Pitot, H. C. & Dove, W. F. A dominate mutation that predisposes to multiple intestinal neoplasia in the mouse. Science 247, 322-324 (1990).
51. Minn, A. J. et al, Lung metastasis genes couple breast tumor size and metastatic spread. Proc. Natl. Acad. Sci. U.S.A. 104, 6740-6745 (2007).
52. Grabowska, M. M. et al. Mouse models of prostate cancer: picking the best model for the question. Cancer Metastasis Rev. 33, 377-397 (2014).
53. Picelli, S. et al. Smart-seq2 for sensitive full-length transcriptome profiling in single cells. Nat Methods 10, 1096-1098 (2013).
54. Picelli, S. et al. Full-length RNA-seq from single cells using Smart-seq2. Nat Protoc 9, 171-181 (2014).
55. Ai, R. et al. Comprehensive epigenetic landscape of rheumatoid arthritis fibroblast-like synoviocytes. Nat Commun 9, 1921 (2018).
56. Fan, S., Huang, K., Ai, R., Wang, M. & Wang, W. Predicting CpG methylation levels by integrating Infinium HumanMethylation450 BeadChip array data. Genomics (2016).
57. Consortium, T. G. The Genotype-Tissue Expression (GTEx) project. Nat Genet 45, 580-585 (2013).
58. Grossman, R. L. et al. Toward a Shared Vision for Cancer Genomic Data. N Eng J Med 375, 1109-1112 (2016).
59. Macosko, E. Z. et al. Highly Parallel Genome-wide Expression Profiling of Individual Cells Using Nanoliter Droplets. Cell 161, 1202-1214 (2015).
60. Lake, B. B. et al. Neuronal subtypes and diversity revealed by single-nucleus RNA sequencing of the human brain. Science 352, 1586-1590 (2016).
61. Sarwar, S. S., Ankit, A. &. Roy, K. Incremental Learning in Deep Convolutional Neural Networks Using Partial Network Sharing, arXiv 1712.02719 (2017).
62. Roy, D., Panda, P. & Roy, K. Tree-CNN: A Hierarchical Deep Convolutional Neural Network for Incremental Learning. arXiv 1802.05800 (2018).
63. Lin, Y. et al. Comparative Molecular Analysis of Gastrointestinal Adenocarcinomas. Cancer Cell 33, 721-735 e728 (2018).
64. Berger, A. C. et al. A Comprehensive Pan-Cancer Molecular Study of Gynecologic and Breast Cancers. Cancer Cell 33, 690-705 e699 (2018).
65. Ricketts, C. J. et al. The Cancer Genome Atlas Comprehensive Molecular Characterization of Renal Cell Carcinoma. Cell Rep 23, 3698 (2018).
66. Campbell, S. D. et al, Genomic, Pathway Network, and Immunologic Features Distinguishing Squamous Carcinomas. Cell Rep 23, 194-212 e196 (2018).
67. Ding, B. et al, Normalization and noise reduction for single cell RNA-seq experiments. Bioinformatics 31, 2225-2227 (2015).
68. Ding, B., Zheng, L. & Wang, W. Assessment of Single Cell RNA-Seq Normalization Methods. G3 (Bethesda) 7, 2039-2045 (2017).
69. Liu, C. & Wang, W. Contextual Regression: An Accurate and Conveniently Interpretable Nonlinear Model for Mining Discovery from Scientific Data. arXiv 1710.10728[q-bio.QM] (2017).
70. Minn, A. J. et al. Genes that mediate breast cancer metastasis to lung. Nature 436, 518-524 (2005).
71. Yang, S., Zhang, J. J. & Huang, X. Y. Mouse models for tumor metastasis. Methods Mol Biol 928, 221-228 (2012).

The invention claimed is:

1. A method for enriching and genetically identifying target cells in a biological sample, comprising:
enriching the target cells by contacting the biological sample with nanoparticles coated with a cell membrane that has a binding affinity with the target cells, wherein the nanoparticles consist of a polymeric particle core coated with the cell membrane that has a binding affinity with the target cells; and
performing single cell nucleic acid sequencing on the enriched target cells.

2. The method of claim 1, wherein the target cells are circulating tumor cells (CTCs).

3. The method of claim 2, wherein the CTCs are breast cancer cells, lung cancer cells, ovarian cancer cells, or stomach cancer cells.

4. The method of claim 1, wherein the nanoparticles are platelet membrane-coated nanoparticles (PNPs).

5. The method of claim 1, wherein the single cell nucleic acid sequencing is single cell RNA sequencing (scRNA-seq).

6. The method of claim 1, further comprising before performing the single cell nucleic acid sequencing, at least partially isolating the nanoparticles bound to the target cells from the biological sample.

7. The method of claim 1, wherein the biological sample is from a mammal.

8. A method for identifying a cancer type or subtype of circulating tumor cells (CTCs) in a biological sample, comprising:
enriching the CTCs by contacting the biological sample with platelet membrane-coated nanoparticles that consist of a polymeric particle core coated with the platelet membrane;
performing single cell nucleic acid sequencing (scRNA-seq) on the enriched CTCs; and
determining the cancer type or subtype of the CTCs based on a comparison of the scRNA-seq and a plurality of genes whose expression profiles are associated with different types or subtypes of cancer.

9. The method of claim 8, wherein the cancer type is breast cancer, lung cancer, ovarian cancer, or stomach cancer.

10. The method of claim 8, wherein the biological sample is from a mammal.

11. The method of claim 1, wherein the polymeric particle core further comprises a substance that has an optical shift property.

12. The method of claim 1, wherein the nanoparticles consist of a polymeric particle core coated with a cell a platelet plasma membrane.

13. The method of claim 8, wherein the polymeric particle core further comprises a substance that has an optical shift property.

14. The method of claim 8, wherein the nanoparticles consist of a polymeric particle core coated with a platelet plasma membrane.

* * * * *